US010093016B2

(12) United States Patent
Ursell et al.

(10) Patent No.: US 10,093,016 B2
(45) Date of Patent: Oct. 9, 2018

(54) TOOL STAND WITH AUTOMATICALLY DEPLOYABLE LEGS

(71) Applicant: Affinity Tool Works, LLC, Troy, MI (US)

(72) Inventors: Mike Ursell, Bloomfield Hills, MI (US); Connor Ursell, Bloomfield Hills, MI (US); Mark Cross, Marysville, MI (US); Sam Ursell, Beverly Hills, MI (US); Ken Neilson, Troy, MI (US)

(73) Assignee: AFFINITY TOOL WORKS, LLC, Troy, MI (US)

( * ) Notice: Subject to any disclaimer, the term of this patent is extended or adjusted under 35 U.S.C. 154(b) by 0 days.

(21) Appl. No.: 15/014,133

(22) Filed: Feb. 3, 2016

(65) Prior Publication Data

US 2016/0368131 A1 Dec. 22, 2016

Related U.S. Application Data

(60) Provisional application No. 62/111,264, filed on Feb. 3, 2015.

(51) Int. Cl.

| | |
|---|---|
| ***F16M 11/38*** | (2006.01) |
| ***B25H 1/04*** | (2006.01) |
| ***A45F 3/14*** | (2006.01) |
| ***A47B 3/08*** | (2006.01) |

(52) U.S. Cl.

CPC ................. *B25H 1/04* (2013.01); *A45F 3/14* (2013.01); *A47B 3/08* (2013.01); *A45F 2003/142* (2013.01)

(58) Field of Classification Search

CPC ....... B25H 1/04; B25H 1/02; A45F 2003/142; A45F 3/14; A47B 3/08

USPC .............. 248/166, 169, 171, 465; 144/286.5, 144/286.1, 287

See application file for complete search history.

(56) References Cited

U.S. PATENT DOCUMENTS

| | | | | |
|---|---|---|---|---|
| 3,286,788 A * | 11/1966 | Swanson | B25H 1/06 | 182/155 |
| 6,745,804 B2 * | 6/2004 | Welsh | B25H 1/04 | 144/287 |
| 2004/0250901 A1 * | 12/2004 | Ursell | B25H 1/04 | 144/286.1 |
| 2010/0288585 A1 * | 11/2010 | Katz | B25H 1/04 | 182/155 |

* cited by examiner

*Primary Examiner* — Christopher Garft

(74) *Attorney, Agent, or Firm* — William H. Honaker; Dickinson Wright PLLC

(57) ABSTRACT

A portable tool stand having automatically deployable legs. The tool stand has a body with a work surface and opposed ends. Deployable legs are pivotally mounted to the tool stand. The legs move between a stored position adjacent to the body and a support position wherein the legs are deployed to support the body. Retractable arms are mounted to each end of the body and slide with respect to the body. The deployable legs and the arms are operably connected such that sliding the arms with respect to the body moves the legs between the stored position and the support position.

25 Claims, 6 Drawing Sheets

TOOL STAND WITH AUTOMATICALLY DEPLOYABLE LEGS

CROSS REFERENCE TO RELATED APPLICATION

This application claims the benefit of U.S. Provisional Application No. 62/111,264 filed Feb. 3, 2015, which is incorporated herein by reference in its entirety.

BACKGROUND OF THE INVENTION

The present invention generally relates to tool support stands. Tool support stands are well known and generally employ a work surface to which a tool, such as a saw, can be mounted and legs to support the stand. These tool support stands come in any number of sizes and shapes, but typically have four legs that are fixed in the support position or can be individually folded or telescoped to a closed position. Some of these known work tables also include extendable work surfaces that can be pulled out to make the overall length of the tool stand longer.

Examples of applicant's tool stands can be found in U.S. Design Pat. Nos. D623,672 and D549,749.

The difficulty with typical tool stands is that they can be large and unwieldy. If the legs are fixed in place, it can be difficult to move the tool stand from job to job. This is true even if wheels are provided to roll the tool stand. Folding legs and extendible legs can be cumbersome. Each log has to be extended or folded out to use the stand and collapsed to transport the stand.

What is needed is a tool stand that is more compact and can be easily transported. Also a tool stand that has legs that can be easily and quickly deployed.

SUMMARY OF THE INVENTION

In general terms, the tool stand of the present invention provides a relatively compact tool stand that is easily transported to and from jobsites. The tool stand can fit in a fairly small space in a vehicle and can be easily carried to the jobsite. In the disclosed embodiment, there are two sets of handles that double as work supports and a strap that can used to carry the tool stand. The handles are connected to the legs of the tool stand and by extending the arms, the legs are quickly and easily deployed.

More specifically the portable tool stand of the present invention includes a body having a generally flat work surface, front and back sides, opposed ends and on open bottom. Arms are mounted at both ends for sliding movement with respect to the ends. The arms slide from a closed position adjacent the ends to an open position spaced from the ends. The arms increase the width of the work surface when in the open position and control the position of the legs when slid with respect to the body.

In the disclosed embodiment, support legs are operatively coupled to the arms such movement of the arms moves the leg. The legs having a retracted position wherein the legs are retracted into the open bottom of the body generally concealing the legs within the body and a support position wherein the legs are extended to support the body. The legs are moved to the retracted position by sliding the arms to the closed position and the legs are moved to the support position by sliding the arms to the open position.

These and other features and advantages of this invention will become more apparent to those skilled in the art from the detailed description of a preferred embodiment. The drawings that accompany the detailed description are described below.

DETAILED DESCRIPTION OF THE PREFERRED EMBODIMENT

Figure 1:
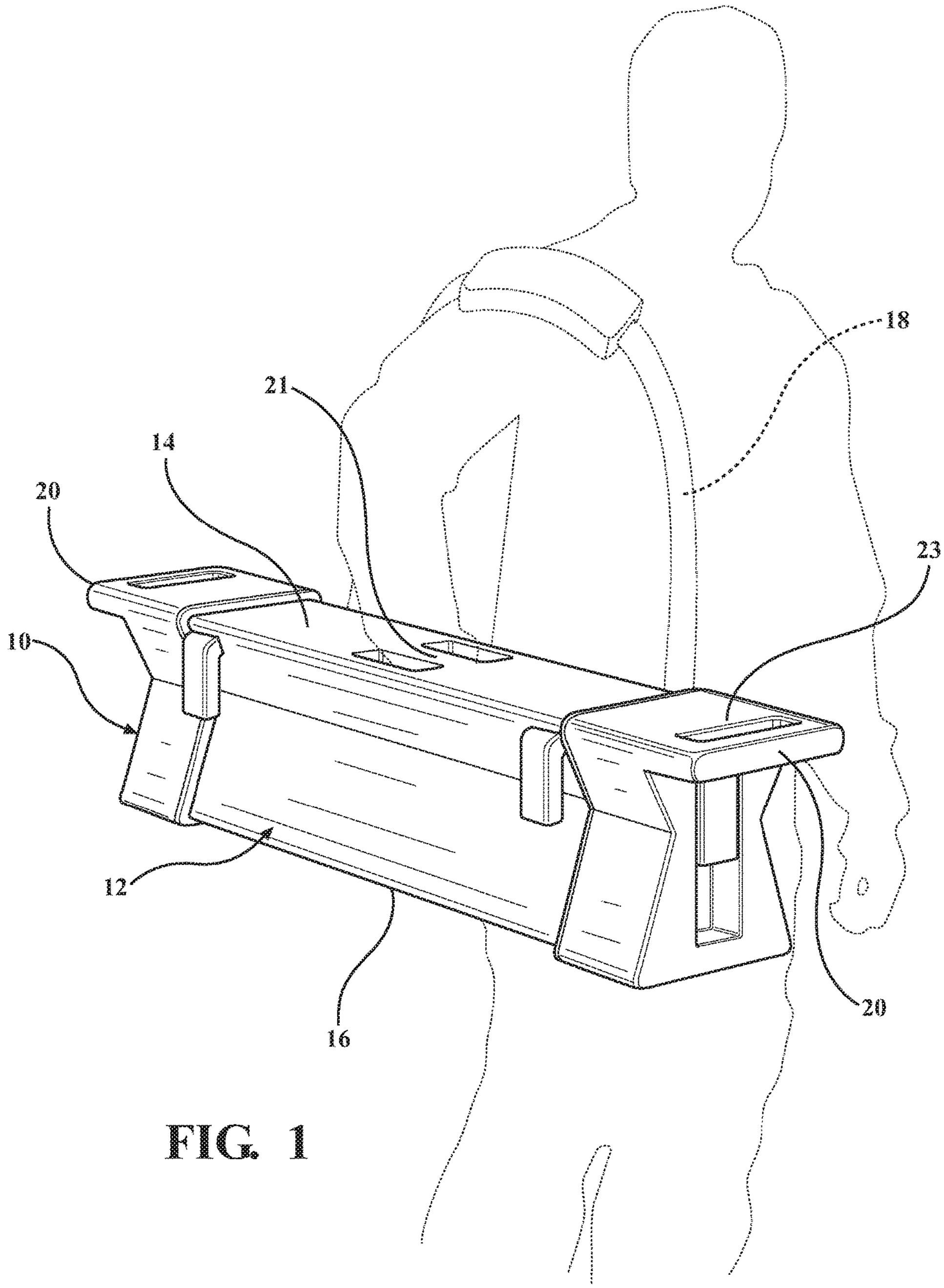
FIG. 1 is a perspective view of the tool stand with automatically deployable legs of the present invention.
Figure 2:
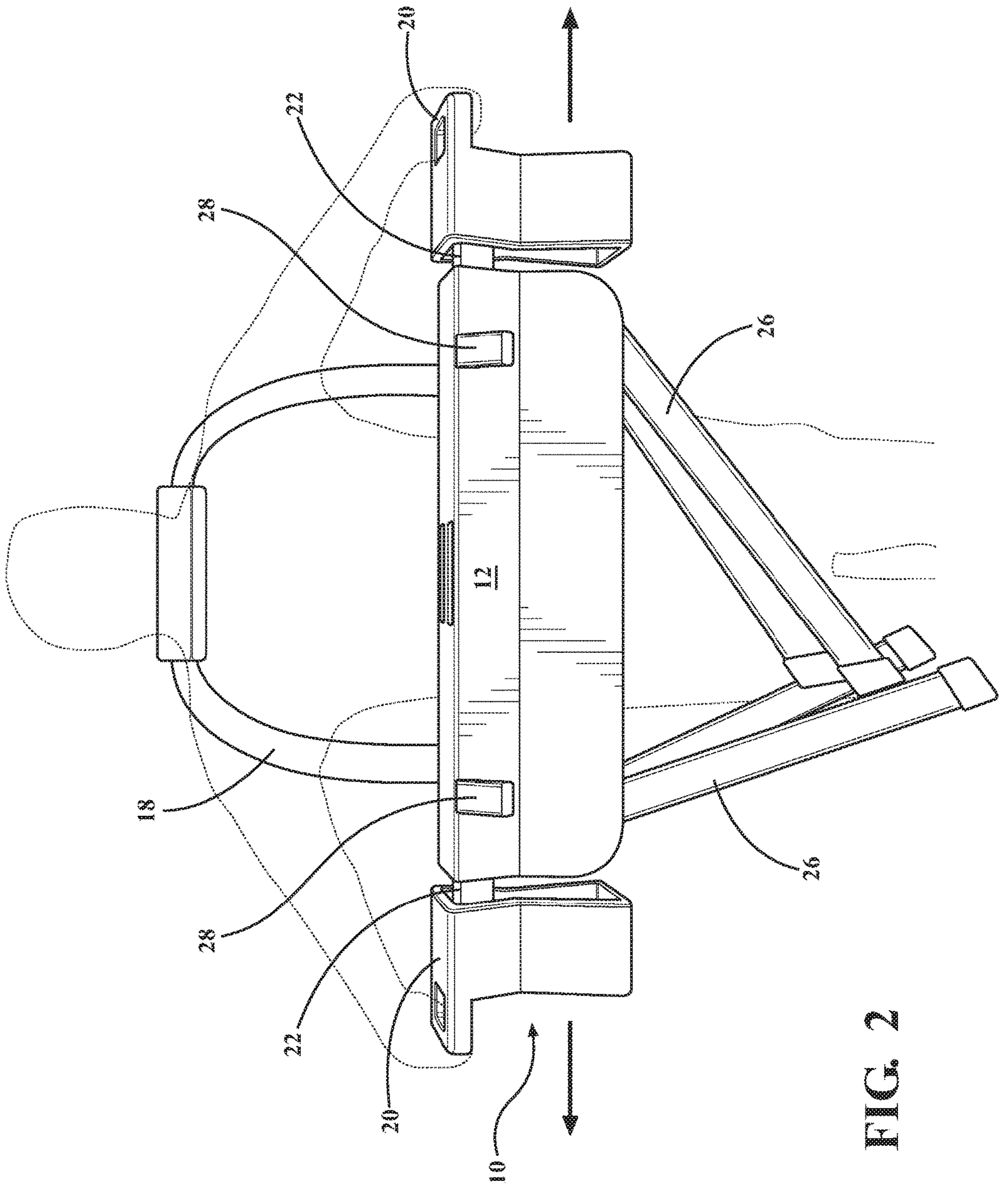
FIG. 2 is front view of the tool stand of the present invention illustrating the arms and deployable legs.

The portable tool stand of the present invention is shown generally at 10 in FIGS. 1 through 4. The tool stand 10 has a body portion 12 with a generally flat top 14 and a bottom surface 16. As illustrated, the bottom surface 16 is generally flat to allow the tool stand to be stored on a generally flat surface. A strap 18 is provided to carry the tool stand 10. Additionally, in the disclosed embodiment, a handgrip 21 is provided to allow the tool stand 10 to be carried by the hand grip 21 in the top 14. As illustrated, the hand grip 21 is formed by an opening in the top 14 with the hand grip 21 spanning that opening.

Handles and material supports 20 are provided on opposed sides of the body portion 12. The handles 20 are mounted on arms 22 that can slide with respect to body portion 12. The handles 20 can be extended to create a work surface that is wider than the width of the body portion 12. The handles 20 can also be moved perpendicular to the arms 22 to raise the top surface 23 of the handle 20 to a position higher than the top 14 of the body portion 12, see FIG. 4. The handles 20 can be adjusted to accommodate material and support the material in the same plane as the tool, such as for example a miter saw. The handles 20 have a slot that receives a pin extending from the arm 22. The pin is spring loaded and the slot has indentations. As the handle 20 is moved, the pins engage the indentations to allow ratcheting of the handle 20 with respect to the arm so discreet changes in height can be maintained. As will be appreciated by those of ordinary skill in the art, other methods for controlling the movement of the handle 20 with respect to the arm 22 will be apparent, such as a slot extending through the handle and a threaded lock extending from the arm 22 and through the slot, a flat spring on either the handle 20 or arm 22 to engage and a step ratchet like slot on the handle or single indentation on the arm 22, etc.

Figure 3:
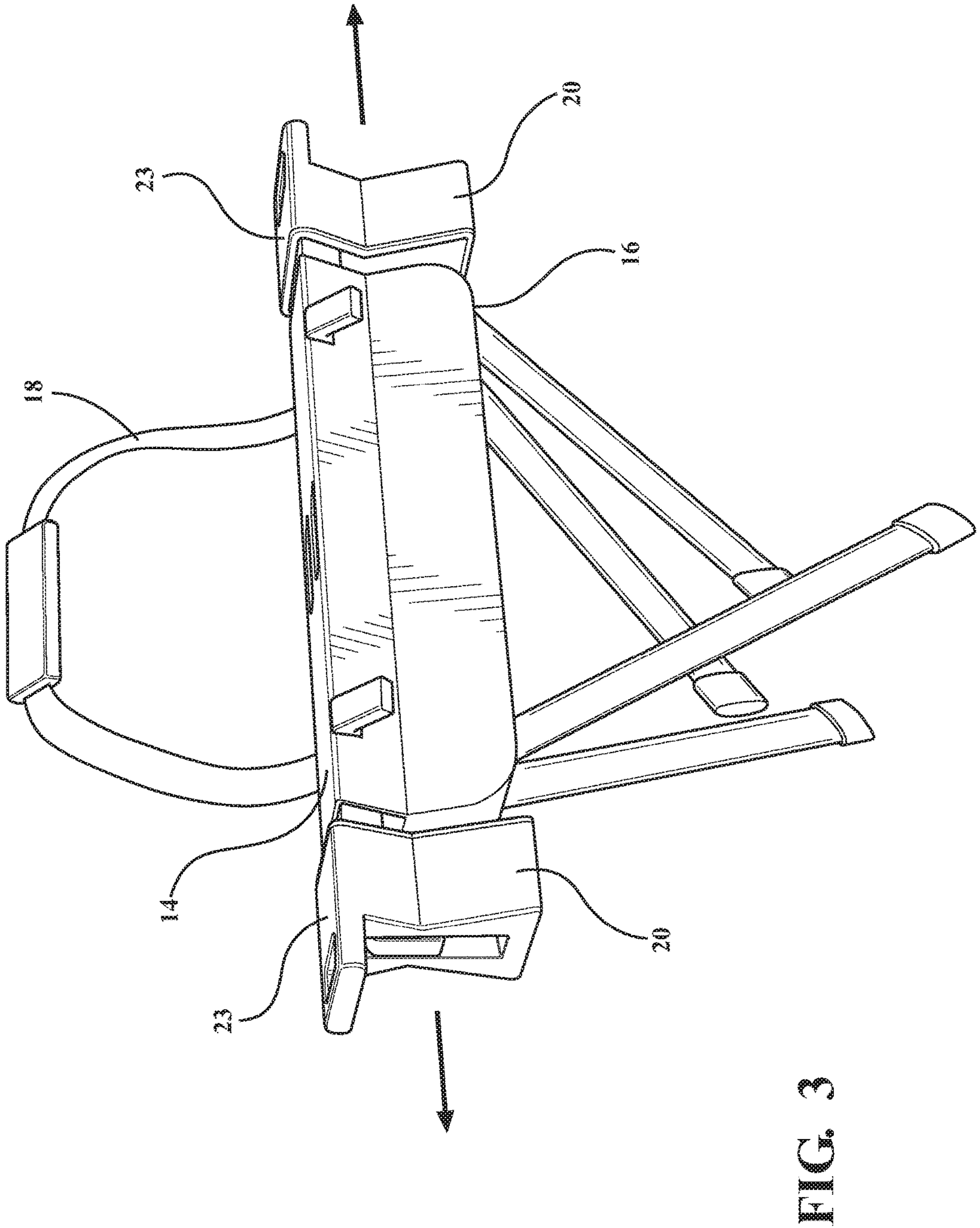
FIG. 3 is a perspective view of the tool stand of the present invention illustrating handles and deployable legs.
Figure 4:
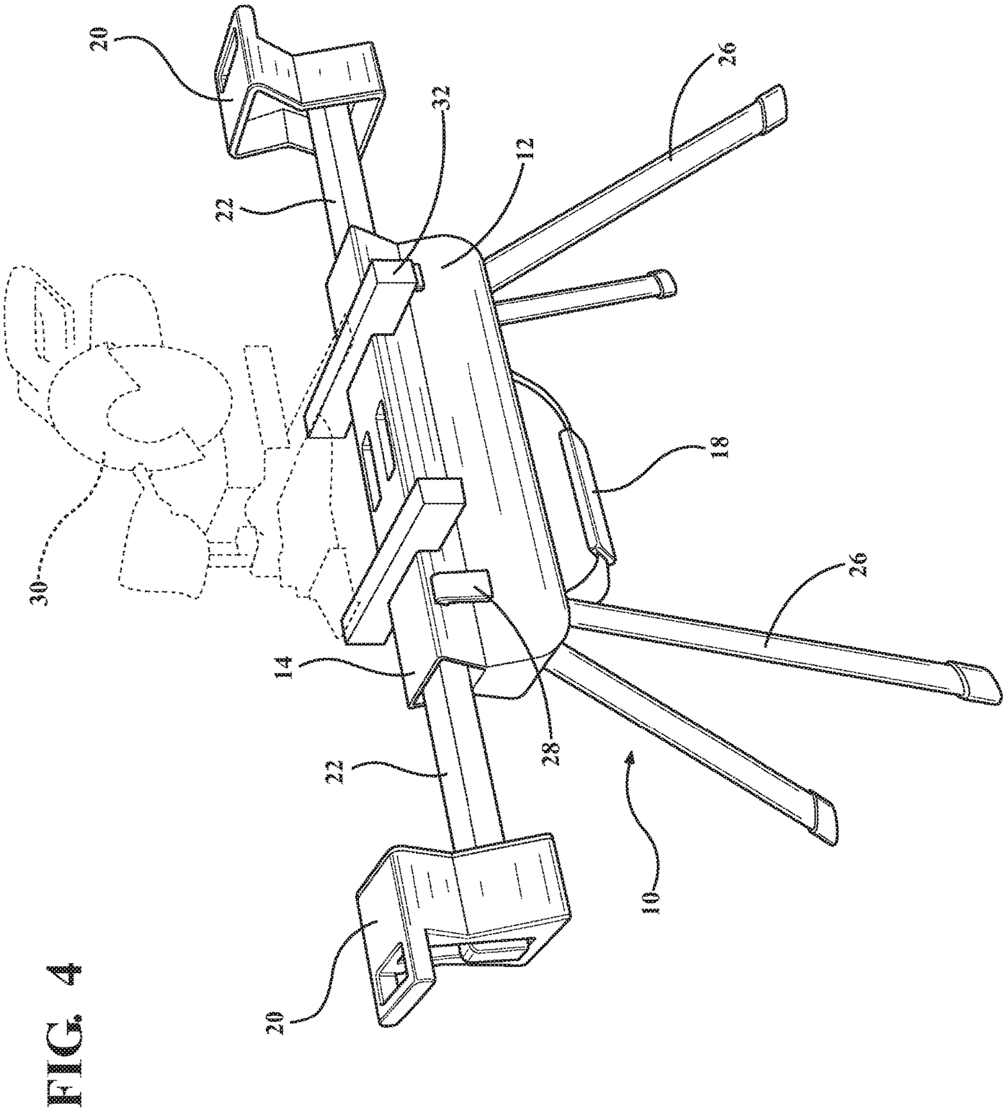
FIG. 4 is a perspective view of the tool stand of the present invention with the arms extended and legs deployed.

The handles 20 and more particularly the arms 22 deploy the legs 26 of the portable tool stand 10. Latches 28 are released to allow the handles 20 to be moved outwardly which simultaneously moves the legs 26 from their stored position, which in the disclosed embodiment in within in the body portion 12, to the deployed position as shown in FIG. 4. The latches 28 can take numerous forms, including a threaded fastener, a latch, a spring loaded pin etc. With reference to FIG. 3, the legs 26 are shown partially deployed.

Figure 5:
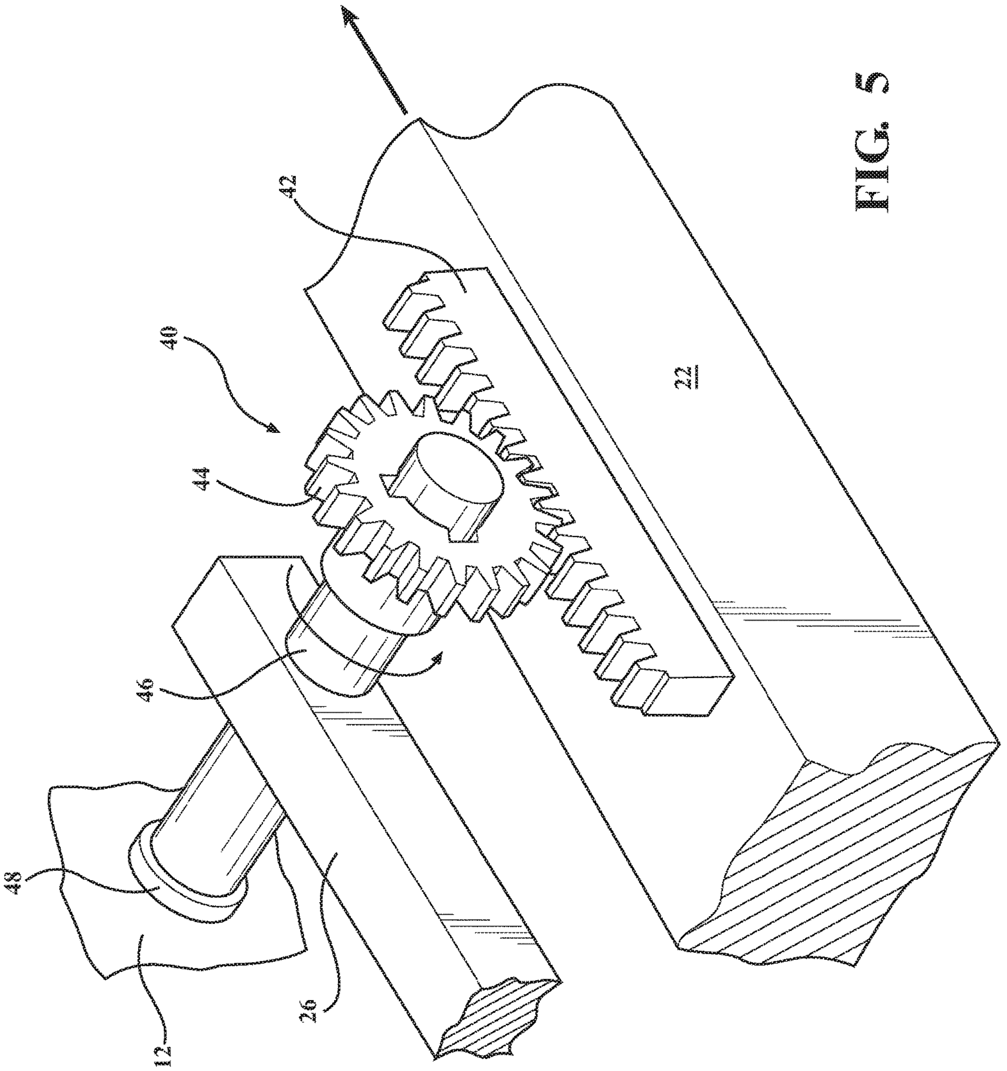
FIG. 5 is a partial perspective view of the rack and pinion deployment system of the present invention.

With reference to FIG. 5, a rack and pinion is generally shown at 40. In the one embodiment of the disclosed embodiment, the legs 26 are deployed by the arms 22 and handles 20 through the use of a rack and pinion as illustrated. The rack 42 is mounted to the arms 22. The pinion 44 is mounted through an axle 46 to the interior of the body 12 and to the legs 26. A bearing 48 is provided on the interior walls of the body 12 to allow the axle 46 to journal when the rack 42 rotates the pinion. As illustrated, the axle 46 is shown cut off and not extending to the other adjacent leg. It should be understood that the axle is intended to extend to the adjacent leg and be journaled in a bearing 48 at the opposite interior wall of the body 12. As will be appreciated, as the arm 22 is pulled out (see the arrow), the pinion 46 rotates counterclockwise (see the arrow) causing the leg 26 to deploy. As will be appreciated, a separate rack 42 and pinion 44 are provided on the opposite side of the tool stand 10 to deploy that set of legs.

Figure 6:
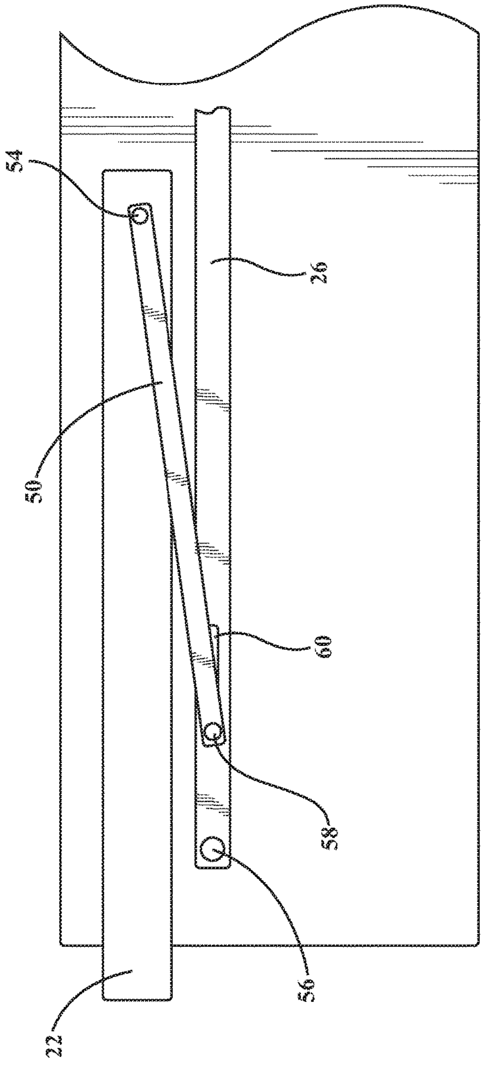
FIG. 6 is a partial perspective view of the linkage deployment system of the present invention with the leg in the storage position.
Figure 7:
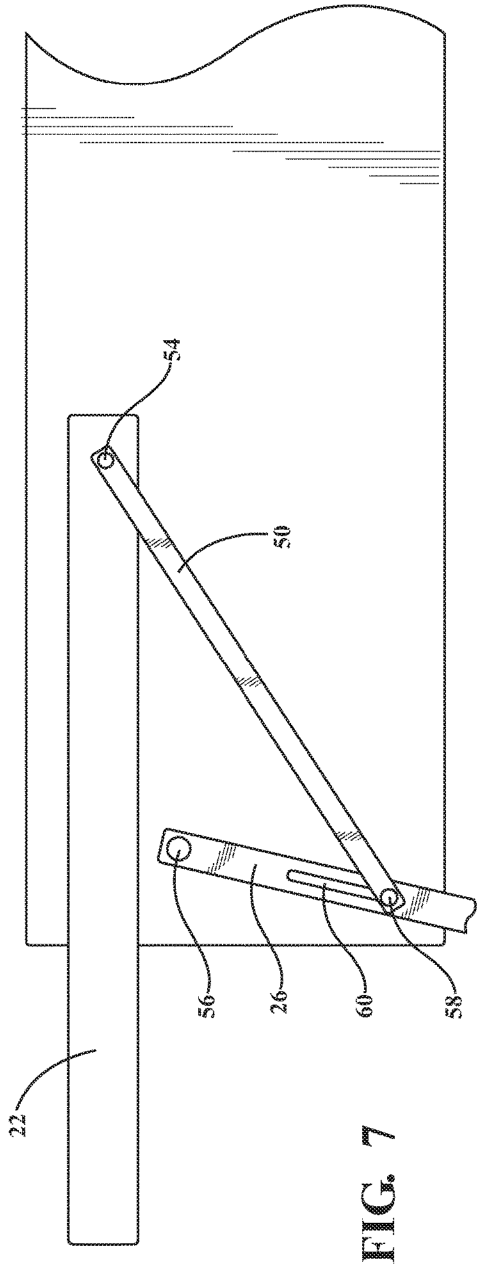
FIG. 7, is a partial perspective view of the linkage deployment system of the present invention with the leg in the use position.

With reference to FIGS. 6 and 7, another embodiment of the leg 26 deployment system is illustrated. In this embodiment, the legs 26 are deployed by the arms 22 through a link 50 connected between the arm 22 and leg 26. The link 50 extends from a pivot point 54 connected the arm 22 and a pin 58 mounted within a slot 60 formed in the leg 26. The leg 26 is pivotally connected to the body 12. With reference to FIG. 6, the leg 26 is in the storage position. The arm 22 is pushed into the body 12 which draws the leg 26 into the body 12. The sidewall of the body is wide enough to receive and hide the leg in the storage position.

With reference to FIG. 7, the arm 22 has been pulled from the body 12 which causes the link 50 to drive against and pivot the leg 26 to the use position. The slot 60 allows the pin 58 room to move to allow the pivoting of the leg 26.

The tool stand 10 is adapted to receive a tool, such as a miter saw 30, see FIG. 4. The miter saw 30 is shown mounted to quick connects 32 to allow the miter saw 30 to be quickly mounted or detached from the stand 10. Quick connects are well known in the art, an example is illustrated in application U.S. Design Pat. No. D623,672, included herein by reference. The top surface 14 of the body portion 12 is specially configured to receive the quick connects 32. As illustrated in FIG. 4, the top surface of the handles 20 can be adjusted upwardly to be parallel to the work surface of the tool 30 to provide a work support surface to support the material being cut.

To deploy the legs the operator releases the latches 28, grasps the handles 20, which pull the arms 22 outwardly and automatically deploy the legs 26 from the storage position to the use position.

When the operator is done with the stand 10 and wants to transport it, the latches 28 are released and the handles 20 are pushed back to the storage position, i.e. adjacent the body 12. This automatically pivots the legs 26 to the storage position within the body portion 12. The latches 28 are then latched to retain the handles in the storage position and the stand can then be easily carried or stored.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A portable tool stand comprising:

a body having a work surface, opposed ends and a longitudinally extending axis;

deployable legs pivotally mounted to said body; said legs moving between a stored position adjacent to said body and a support position wherein said legs are deployed to support said body;

at least one arm is mounted for sliding parallel to said longitudinally extending axis with respect to one end of said body portion, said at least one arm sliding parallel with respect to said body between a transport position and a use position;

said deployable legs and said arm being operably connected such that sliding said arm with respect to said body moves said legs between said stored position and said support position; and a handle attached to said at least one arm with said handle being mounted for movement generally perpendicular to said at least one arm, such that said handle can be raised and lowered with respect to said at least one arm.

2. The portable tool stand of claim 1, wherein said at least one arm includes a pair of arms, with one of said pair of arms being mounted for sliding parallel to said longitudinally extending axis with respect to each end, and two sets of deployable legs pivotally mounted to said body at opposed positions; one of said pair of arms being operatively connected to a respective one of said set of said deployable legs.

3. The portable tool stand of claim 1, wherein said handle has flat support surfaces to support material in a plane parallel to a tool mounted to the work surface.

4. The portable tool stand of claim 3, further including stops to hold said handle in said raised position.

5. The portable tool stand of claim 1, further including locks to lock said at least one arm in said transport position and said use position.

6. The portable tool stand of claim 1, further including a carrying handle in said work surface.

7. The portable tool stand of claim 1, further including a carrying strap connected to said body.

8. The portable tool stand of claim 1, wherein said body includes front and back walls that extend down from said work surface and conceal said legs when in said stored position.

9. The portable tool stand of claim 1, wherein said at least one arm and legs are operably connected by a link pivotally connected between said arm and leg, said link pulling said leg to said stored position and pushing said leg to said support position.

10. The portable tool stand of claim 1, wherein said at least one arm and legs are operably connected by a rack and pinion, said rack being mounted to said arm and said pinion being mounted to said legs, sliding said arm from said body pulls said rack with respect to said pinion, rotating said pinion and pivoting said leg from said stored position to said support position, and sliding said arm into said body, rotates said pinion to pivot said leg from said support position to said storage position.

11. A portable tool stand comprising:

a body having a generally flat work surface, front and back sides, opposed ends and an open bottom;

arms mounted at both ends for sliding movement with respect to said ends, said arms sliding from a closed position adjacent said ends and an open position spaced from said ends, said arms increase the longitudinal length of said work surface when in said open position;

support legs operatively couple to said arms such movement of said arms moves said legs, said legs having a retracted position wherein said legs are retracted into said open bottom of said body generally concealing said legs within said body and a support position wherein said legs are extended to support said body, said legs being moved to said retracted position by sliding said arms to said closed position and said legs being moved to said support position by sliding said arms to said open position; and handles attached to said arms, said handles being mounted for movement generally perpendicular to said arms, such that said handles can be raised and lowered with respect to said arms.

12. The portable tool stand of claim 11, wherein said handles have flat support surfaces to support material in a plane parallel to a tool mounted to the work surface, said handles including stops to hold said handle in said raised position.

13. The portable tool stand of claim 11, further including locks to lock said arms in said open position and said closed position.

14. The portable tool stand of claim 11, wherein said arms and legs are operably connected by a link pivotally connected between said arms and legs, said link moving said legs to said retracted position when said arms are moved to said closed position and moving said legs to said support position when said arms are moved to said open position.

15. The portable tool stand of claim 11, wherein said arms and legs are operably connected by a rack and pinion, said rack being mounted to said arms and said pinion being mounted to said legs, sliding said arms from said body to said open position pulls said rack with respect to said pinion, rotating said pinion and pivoting said legs from said retracted position to said support position, and sliding said arms into said body to said closed position, rotates said pinion to pivot said legs from said support position to said retracted position.

16. A portable tool stand comprising:

a body having a work surface and opposed ends;

deployable legs pivotally mounted to said body; said legs moving between a stored position adjacent to said body and a support position wherein said legs are deployed to support said body;

at least one arm is mounted for sliding with respect to one end of said body portion, said at least one arm sliding with respect to said body between a transport position and a use position;

said deployable legs and said at least one arm being operably connected such that sliding said at least one arm with respect to said body moves said legs between said stored position and said support position;

handles attached to said at least one arm, said handles are mounted for movement generally perpendicular to said at least one arm, such that said handles can be raised and lowered with respect to said at least one arm.

17. The portable tool stand of claim 16, wherein said at least one arm includes a pair of arms, with one of said pair of arms being mounted for sliding with respect to each end, and two sets of deployable legs pivotally mounted to said body at opposed positions; one of said pair of arms being operatively connected to a respective one of said set of said deployable legs.

18. The portable tool stand of claim 16, wherein said handles have flat support surfaces to support material in a plane parallel to a tool mounted to the work surface.

19. The portable tool stand of claim 16, further including stops to hold said handle in said raised position.

20. The portable tool stand of claim 16, further including locks to lock said at least one arm in said transport position and said use position.

21. The portable tool stand of claim 16, further including a carrying handle in said work surface.

22. The portable tool stand of claim 16, further including a carrying strap connected to said body.

23. The portable tool stand of claim 16, wherein said body includes front and back walls that extend down from said work surface and conceal said legs when in said stored position.

24. The portable tool stand of claim 16, wherein said arm and legs are operably connected by a link pivotally connected between said at least one arm and leg, said link pulling said leg to said stored position and pushing said leg to said support position.

25. The portable tool stand of claim 16, wherein said at least one arm and legs are operably connected by a rack and pinion, said rack being mounted to said at least one arm and said pinion being mounted to said legs, sliding said at least one arm from said body pulls said rack with respect to said pinion, rotating said pinion and pivoting said leg from said stored position to said support position, and sliding said at least one arm into said body, rotates said pinion to pivot said leg from said support position to said storage position.

* * * * *